Jan. 20, 1942.  G. S. SCHMIDT  2,270,349
ANTISKID CHAIN LINK
Filed March 30, 1940
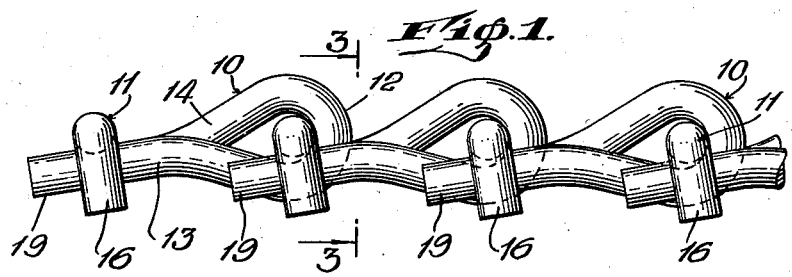
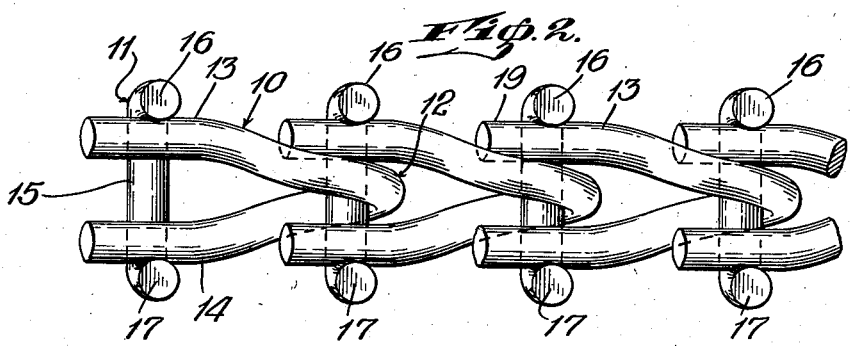
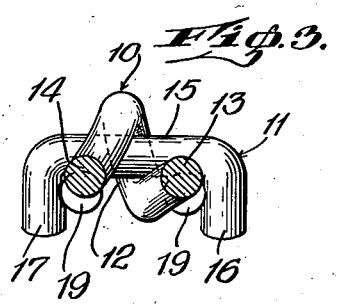
INVENTOR
GEORGE SMALL SCHMIDT
BY
ATTORNEY Patented Jan. 20, 1942

2,270,349

UNITED STATES PATENT OFFICE 2,270,349

ANTISKID CHAIN LINK

George Small Schmidt, York, Pa., assignor to American Chain & Cable Company, Inc., New York, N. Y., a corporation of New York Application March 30, 1940, Serial No. 326,841

4 Claims. (Cl. 152—245)

This invention relates to improvements in anti-skid chain links.

One of the objects of this invention is an improved link construction for use in anti-skid chains, of the type consisting of a plurality of members crossing each other and welded together adjacent their ends and in which the projecting ends of the members comprising the link constitute anti-skid devices.

A more specific object of this invention is the construction of a link of this type in which one of the members constitutes the main body of the link and provides the side strands and a connecting loop portion at one end of the link for connecting with an adjacent link, and in which the other member is welded across the legs of the first member and provides the connecting portion at this end of the link, and has its ends projecting below the other member and constituting anti-skid devices.

Another object of this invention is to provide a link with anti-skid devices at the front and rear side of the link with reference to the direction of travel so constructed that when the link is connected in a chain and applied crosswise of a tire the road engaging portion of the anti-skid device on the front side of the link will be spaced a greater distance from the tire than that on the rear side of the link.

Another object of this invention is the construction of a link of this character in which relative rotation of one link with respect to an adjacent link about its longitudinal axis will be substantially prevented in one direction and in which a chain section consisting of such links when used as a cross chain on a tire will be prevented from bending out of its plane about an axis radially of the tire and wheel under forces of traction.

Other objects of the invention will appear from the following description taken in connection with the drawing, in which—

Fig. 1 is a side elevational view of a section of chain consisting of links made in accordance with my invention and which may be regarded as in contact with the road and mounted transversely on a tire on a vehicle traveling away from the observer;

Fig. 2 is a bottom plan view of the section of chain shown in Fig. 1; and

Fig. 3 is a cross section on the line 3—3 of Fig. 1.

The link illustrated for the purpose of disclosing my invention comprises two members 10 and 11. The member 10 is of hairpin shape with its looped end 12 twisted at an angle of about 60° with respect to the plane of its legs 13 and 14 for connection with the transverse portion 15 of the member 11 which straddles the legs of the member 10 of another link and is welded on the upper face thereof adjacent their free ends as indicated in the figures. The legs 16 and 17 of the member 11 project downwardly below the legs 13 and 14 of the member 10 to function as anti-skid devices in an anti-skid chain. The legs 13 and 14 of the member 10 may extend beyond the cross member 15 of the member 11 to provide anti-skid devices and as disclosed in Fig. 2 to share wear with the ground engaging portion of the loop 12. The projecting end 19 of the leg 13 of each link engages the twisted portion of the corresponding leg of the next adjacent link toward the left to lock the first mentioned link against counter-clockwise rotation Fig. 2 about an axis substantially normal to the plane of the chain.

The chain link as disclosed in Fig. 1 may be considered as being mounted on a tire which is on a vehicle moving away from the observer with the anti-skid devices 16 and 17 in contact with the road, see Fig. 3. The projecting ends of the legs 13 and 14 of the member 10 are also in position to act as anti-skid devices especially when the chain assumes the transverse curvature of the tire. With the chain so mounted the front legs 17 of the members 11 have their road engaging ends farther spaced from the tread of the tire than the rear legs 16 of the members 11 so that the chain as it approaches the road will cause the legs 16 and 17 to engage the road substantially at the same time. Furthermore, greater weight will be placed on the legs 17 than on the legs 16 as the tire runs over the chain so that the front legs 17 will be substantially as effective as the rear legs 16 even after slight rolling movement of the link. It is to be noted also from Figs. 1 and 2 that any tendency to bend the chain during traction out of its general horseshoe shape when placed crosswise of the tire, will be substantially prevented by the projecting ends 19 as hereinbefore explained.

While I have disclosed one embodiment of my invention, it is to be understood that the invention may take different forms and that I reserve the right to all such changes as fall within the principles of my invention and the scope of the appended claims.

I claim:

1. An anti-skid chain link consisting of two generally U-shaped members, one of said members being elongated and constituting the main body of the link, its legs constituting the side strands of the link and its transverse portion a closed end of the link, the other of said members being arranged on top of and embracing the legs of said first mentioned member near their ends, and extending at right angles thereof and having its legs projecting below the legs of said first mentioned member and constituting anti-skid devices, and the body portion of said last mentioned member being adapted for connection with the transverse portion of the first mentioned member of an adjacent link.

2. An anti-skid chain link consisting of two generally U-shaped members, one of which is elongated and constitutes the main body of the link, its legs constituting the side strands of the link and its transverse portion a closed end of the link, the other of said members embracing the legs of said first mentioned member near their ends, and arranged at right angles thereof and having its legs projecting below the legs of said first mentioned member and constituting anti-skid devices, the body portion of said last mentioned member being adapted for connection with the transverse portion of the first mentioned member of an adjacent link, the transverse portion of said first mentioned member being twisted out of the plane of its legs for direct connection with the body portion of said second mentioned member.

3. An anti-skid chain comprising a series of links each consisting of two generally U-shaped members, one of which is elongated and constitutes the main body of the link, its legs constituting the side strands of the links and its transverse portion a closed end of the link, the other of said members embracing the legs of said first mentioned member near their ends, and arranged at right angles thereof and having its legs projecting below the legs of said first mentioned member and constituting anti-skid devices, the body portion of said last mentioned member being adapted for connection with the transverse portion of the first mentioned member of an adjacent link, the transverse portion of said first mentioned member being twisted out of the plane of its legs for direct connection with the body portion of said second mentioned member of an adjacent link, the tire engaging portion of said twisted transverse portion of the first mentioned member lying above the end of one of the legs of the first mentioned member of an adjacent link.

4. An anti-skid chain comprising a series of links each consisting of two generally U-shaped members one of which lies in a horizontal plane and is elongated and constitutes the main body of the link, the other of which lies on top of and embraces the legs of the first mentioned member near their ends and has its legs projecting below the legs of the first mentioned member and constituting anti-skid devices, the transverse portion of said first mentioned member being twisted out of the plane of its legs for direct connection with the second mentioned member of an adjacent link, the tire engaging portion of said twisted transverse portion lying above the end of one of the legs of the first mentioned member of the adjacent link and the ground engaging portion of said transverse twisted portion lying between the ends of the legs of the first mentioned member of said latter adjacent link.

GEORGE SMALL SCHMIDT.